(12) United States Patent
Yuan

(10) Patent No.: US 12,309,856 B2
(45) Date of Patent: May 20, 2025

(54) BINDING METHOD AND SYSTEM FOR DEVICE NETWORK CONFIGURATION, AND MOBILE TERMINAL AND STORAGE MEDIUM

(71) Applicant: SHENZHEN TCL NEW TECHNOLOGY CO., LTD., Guangdong (CN)

(72) Inventor: Wenjian Yuan, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 350 days.

(21) Appl. No.: 17/758,260

(22) PCT Filed: Aug. 26, 2020

(86) PCT No.: PCT/CN2020/111305
§ 371 (c)(1),
(2) Date: Jun. 30, 2022

(87) PCT Pub. No.: WO2021/135299
PCT Pub. Date: Jul. 8, 2021

(65) Prior Publication Data
US 2023/0040580 A1    Feb. 9, 2023

(30) Foreign Application Priority Data
Dec. 30, 2019   (CN) .......................... 201911393285.9

(51) Int. Cl.
| H04W 76/11 | (2018.01) |
| H04L 12/28 | (2006.01) |
| H04L 67/12 | (2022.01) |

(52) U.S. Cl.
CPC ......... *H04W 76/11* (2018.02); *H04L 12/2834* (2013.01); *H04L 67/12* (2013.01)

(58) Field of Classification Search
CPC .............................. H04W 76/11; H04L 67/12
See application file for complete search history.

(56) References Cited

U.S. PATENT DOCUMENTS

| 2014/0282991 | A1* | 9/2014 | Watanabe ............. | H04W 12/06 726/9 |
| 2015/0341356 | A1 | 11/2015 | Dong et al. | |
| 2020/0068658 | A1* | 2/2020 | Lee ........................ | H04W 48/08 |

FOREIGN PATENT DOCUMENTS

| CN | 105546931 A | 5/2016 |
| CN | 105554146 A | 5/2016 |

(Continued)

OTHER PUBLICATIONS

International Search Report in International application No. PCT/CN2020/111305, mailed on Dec. 7, 2020.

(Continued)

*Primary Examiner* — Zhiren Qin
(74) *Attorney, Agent, or Firm* — PV IP PC; Wei Te Chung

(57) ABSTRACT

Disclosed are a binding method and system for device network configuration, and a mobile terminal and a storage medium. The method comprises: according to a request made to a cloud server from a smart device needing to be configured, acquiring device information of the smart device and a binding code; receiving the binding code generated by the cloud server, and the device information sent by same, and connecting the smart device according to the device information, and sending the binding code to the connected smart device, such that when the smart device is registered to the cloud server, the binding and connection to the smart device are realized according to the binding code.

15 Claims, 4 Drawing Sheets

(56) References Cited

FOREIGN PATENT DOCUMENTS

| | | | |
|---|---|---|---|
| CN | 105704116 A | 6/2016 |
| CN | 106301785 A | 1/2017 |
| CN | 106571974 A | 4/2017 |
| CN | 106792996 A | 5/2017 |
| CN | 107527076 A | 12/2017 |
| CN | 108259643 A | 7/2018 |
| CN | 108646578 A | 10/2018 |
| CN | 110300117 A | 10/2019 |
| CN | 110351169 A | 10/2019 |
| CN | 110572305 A | 12/2019 |

OTHER PUBLICATIONS

Written Opinion of the International Search Authority in International application No. PCT/CN2020/111305, mailed on Dec. 7, 2020.
Chinese Office Action issued in corresponding Patent Application No. 201911393285.9 dated Dec. 2, 2021, pp. 1-8.

* cited by examiner

BINDING METHOD AND SYSTEM FOR DEVICE NETWORK CONFIGURATION, AND MOBILE TERMINAL AND STORAGE MEDIUM

CROSS-REFERENCE TO RELATED APPLICATION

This application is a US national phase application based upon an International Application No. PCT/CN2020/111305, filed on Aug. 26, 2020, which claims priority to Chinese Patent Application No. 201911393285.9, entitled "BINDING METHOD AND SYSTEM FOR DEVICE NETWORK CONFIGURATION, AND MOBILE TERMINAL AND STORAGE MEDIUM", filed on Dec. 30, 2019, the disclosure of which is incorporated herein by reference in its entirety.

FIELD OF DISCLOSURE

The present disclosure relates to a field of Internet of Things technology, and more specifically, to a binding method for device network configuration, a binding system for device network configuration, a mobile terminal and a storage medium.

BACKGROUND

With continuous advancement of the Internet of Things (IoT, which allows all common physical objects that can be independently addressed to form an interconnected network) technology, more and more common electrical appliances in life are joining an IoT family. With a mobile phone as an entry point, users may know statuses of electrical appliances and control them anytime and anywhere in an environment with Internet access, which improves people's quality of life and brings a lot of convenience to people.

In order for a mobile phone to be able to control a smart device, it is necessary to configure the smart device to access the Internet and bind it to a mobile phone of a user. Traditional methods for IoT network configuration are complex, insecure, and inefficient, and the user binds the device to a server through the mobile phone of the user. The user usually needs to connect to different WIFI hotspots to perform a process of binding for the whole network configuration, so different mobile phone operating systems and mobile phone models may require the user to manually change WIFI settings on the mobile phone, which is relatively complicated and inefficient. For instance, some methods for network configuration require users to scan a QR code to obtain device information, so there is a problem that the QR code is broken and the device information cannot be obtained by the broken QR code. In addition, some devices expose service set identifier (SSID) of a connection to the user through a smart device, and information such as password and check code are filled in the SSID, so there is a problem that anyone is allowed to connect at will.

Therefore, the existing technology needs to be improved and developed.

SUMMARY

The principal object of the present disclosure is to provide a binding method for device network configuration, a binding system for device network configuration, a mobile terminal and a storage medium, aiming to solve problems of complexity, insecurity and inefficiency in the methods for the IoT network configuration in the prior art.

To achieve the above object, the present disclosure provides a binding method for device network configuration, and the binding method for device network configuration includes following steps:

acquiring device information of a smart device and a binding code according to a request made to a cloud server from the smart device needing to be configured;

receiving the binding code generated by the cloud server, and the device information sent by same, and connecting the smart device according to the device information; and sending the binding code to the connected smart device, such that when the smart device is registered to the cloud server, the binding and connection to the smart device are realized according to the binding code.

Optionally, according to the binding method for device network configuration, before a step of acquiring device information of the smart device and the binding code according to the request made to the cloud server from the smart device needing to be configured, the method further includes:

acquiring SoftAP information of the smart device;

connecting the smart device according to the SoftAP information.

Optionally, according to the binding method for device network configuration, wherein the step of acquiring device information of the smart device and the binding code according to the request made to the cloud server from the smart device needing to be configured, specifically includes:

acquiring a device icon corresponding to the smart device after the smart device needing to be configured is detected to be in a network-configurable state;

requesting the cloud server to obtain the device information of the smart device and the binding code according to the device icon.

Optionally, according to the binding method for device network configuration, wherein the device information includes a service set identifier and a password of the smart device;

the binding code is a binding code with a certain time limit, and the binding code is configured to bind the smart device when the smart device is registered to the cloud server.

Optionally, according to the binding method for device network configuration, wherein a step of receiving the binding code generated by the cloud server, and the device information sent by same, and connecting the smart device according to the device information, specifically includes:

receiving the binding code and the device information sent by the cloud server after the cloud server generates the binding code according to identity information sent by a local device;

connecting the SoftAP of the smart device according to the service set identifier and the password of the smart device.

Optionally, according to the binding method for device network configuration, wherein a step of sending the binding code to the connected smart device, such that when the smart device is registered to the cloud server, the binding and connection to the smart device are realized according to the binding code, specifically includes:

acquiring a router account and a router password of a router in a current scenario, and sending the router account, the router password and the binding code to the smart device;

performing the binding and connection to the smart device according to the binding code after the smart device connects to the router according to the router account and the router password and device information registration is performed on the cloud server according to the binding code.

Optionally, according to the binding method for device network configuration, wherein after the step of sending the binding code to the connected smart device, such that when the smart device is registered to the cloud server, the binding and connection to the smart device are realized according to the binding code, the method further includes a step of:

receiving a response message with a MAC address of the smart device returned by the smart device.

Optionally, according to the binding method for device network configuration, wherein after the step of receiving a response message with a MAC address of the smart device returned by the smart device, the method further includes:

connecting the router and starting to broadcast a search device message, until the smart device returns a device ID as a search device response message after the smart device has been successfully registered to the cloud server, so that the binding for smart device network configuration is performed.

In addition, to achieve the above object, the present disclosure also provides a mobile terminal, wherein the mobile terminal includes: a memory, a processor, and a binding program for device network configuration that is stored in the memory and is running on the processor. When the binding program for device network configuration is executed by the processor, the steps of the binding method for device network configuration described above are implemented.

In addition, to achieve the above object, the present disclosure also provides a binding system for device network configuration, wherein the binding system for device network configuration includes the mobile terminal described above, and the binding system for device network configuration further includes:

a cloud server and at least one smart device respectively connected in communication with the mobile terminal, wherein the smart device is connected in communication with the cloud server;

the mobile terminal configured to select the smart device needing to be configured, request the cloud server to obtain the device information of the smart device and the binding code, and realize the binding and connection to the smart device according to the binding code;

the cloud server configured to generate the binding code and send the binding code and the device information to the mobile terminal;

the smart device configured to receive the router account, the router password and the binding code sent by the mobile terminal, connect to the router according to the router account and the router password, perform device information registration on the cloud server according to the binding code, and return a response message to the mobile terminal.

Optionally, according to the binding system for device network configuration, the smart device is reset by pressing a button in advance to be in a network-configurable state, or the smart device is controlled to be in a network-configurable state through a remote control.

Optionally, according to the binding system for device network configuration, wherein the mobile terminal realizes a binding process for network configuration with the smart device through APP or voice recognition.

Optionally, according to the binding system for device network configuration, wherein the binding code allocated by the cloud server to an APP of the mobile terminal is generated according to identity information sent by the local device.

Optionally, according to the binding system for device network configuration, wherein the cloud server sends the generated binding code, the service set identifier and the password of the smart device to the mobile terminal, and after receiving the service set identifier and the password of the smart device, the mobile terminal will connect to an enabled SoftAP of the smart device.

In addition, to achieve the above object, the present disclosure also provides a storage medium, wherein the storage medium stores a binding program for device network configuration, and the binding program for device network configuration is executed by a processor to implement the above-mentioned steps of the binding method for device network configuration.

The present disclosure acquires device information of the smart device and the binding code according to the request made to the cloud server from the smart device needing to be configured; receives the binding code generated by the cloud server, and the device information sent by same, and connects the smart device according to the device information; and sends the binding code to the connected smart device, such that when the smart device is registered to the cloud server, the binding and connection to the smart device are realized according to the binding code. According to the present disclosure, a time-limit binding code is allocated to the mobile terminal by means of the cloud server so that the smart device is bound to the mobile terminal of the user when registering the smart device, such that it is ensured that the device information is secure and cannot be leaked, and the efficiency of the whole network configuration process is also improved.

DETAILED DESCRIPTION

To make the objects, technical solutions, and technical effects of the present disclosure clearer, the present disclosure will be further described in detail hereafter with reference to the accompanying drawings and examples. It should be understood that the specific embodiments described herein are simply used to explain the present disclosure, but not to limit the present disclosure.

Embodiment I

Figure 1:
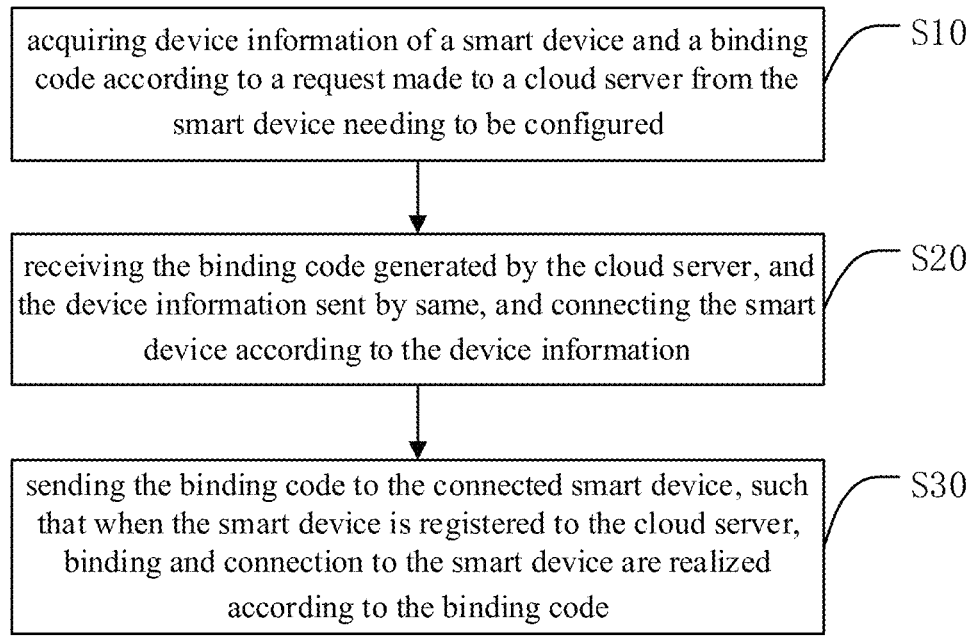
FIG. 1 is a flowchart of a preferred embodiment of a binding method for device network configuration of the present disclosure.
Figure 7:
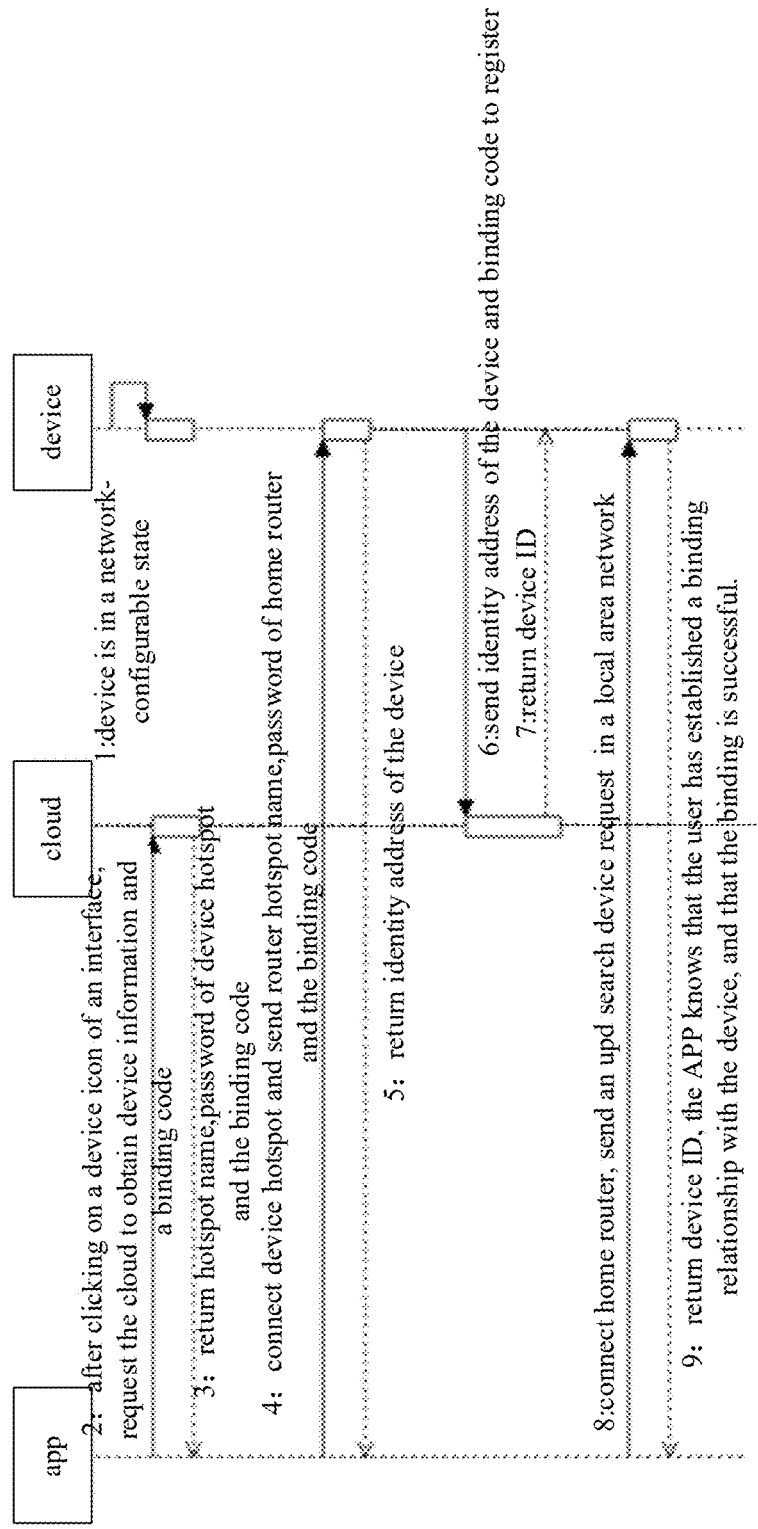
FIG. 7 is a schematic diagram of a principle of communication and interaction between a mobile terminal, a cloud server, and a smart device in a preferred embodiment of the binding system for device network configuration of the present disclosure.

A binding method for device network configuration is described in a preferred embodiment of the present disclosure. As shown in FIG. 1 and FIG. 7, the binding method for device network configuration includes the following steps:

Step S10: acquiring device information of a smart device and a binding code according to a request made to a cloud server from the smart device needing to be configured.

Figure 2:
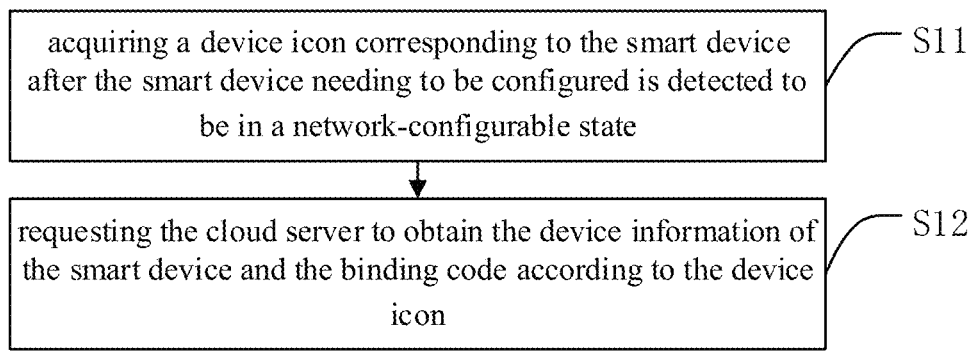
FIG. 2 is a flowchart of step S10 in the preferred embodiment of the binding method for device network configuration of the present disclosure.

For a specific process, please refer to FIG. 2, which is a flowchart of step S10 according to the binding method for device network configuration provided by the present disclosure.

As shown in FIG. 2, the step S10 includes:

Step S11: acquiring a device icon corresponding to the smart device after the smart device needing to be configured is detected to be in a network-configurable state;

Step S12: requesting the cloud server to obtain the device information of the smart device and the binding code according to the device icon.

Specifically, before the step S10, the method also includes: the mobile terminal acquires a SoftAP (which provides a same signal as AP through a driver program, and its hardware part is a standard wireless network card, but it provides functions such as signal switching, routing as AP through the driver program, wherein a full name of AP is Access Point, namely, wireless access point, thus SoftAP can reduce costs of wireless networking) information of the smart device in advance, and connects the smart device according to the SoftAP information.

Further, the smart device is reset by pressing a button in advance to be in the network-configurable state, or the smart device is controlled to be in the network-configurable state through a remote control (there are various ways to control the smart device to be in the network-configurable state, and they vary from manufacturer to manufacturer), and the smart device enables the SoftAP to which the mobile terminal is connected. A SoftAP name (service set identifier, SSID) and a password of the SoftAP will be pre-stored in device firmware and a cloud database (devices of the same type have a same SSID, for instance, air conditioners are one type of SSID, and refrigerators are another type of SSID Wherein, the smart devices mainly refer to smart home appliances, such as air conditioners, refrigerators, washing machines, televisions, and other devices. This disclosure is to allow a user to control these smart devices through the mobile terminal (such as a smartphone, a smart speaker, and a laptop), which needs to be connected to the Internet and be bound to the mobile terminal of the user.

The mobile terminal described in the present disclosure takes a smartphone as an example, and the user can realize a binding process for smart device network configuration through an APP on the smartphone. The user accesses the APP through the smartphone, and the APP provides a function of network configuration for the smart device, and icons of various home appliances are pre-stored in the APP. After accessing the APP, the user clicks on a corresponding device icon according to the smart device needing to be configured. For instance, if the smart device is an air conditioner, the user clicks on an air conditioner icon, while if the smart device is a washing machine, the user clicks on a washing machine icon.

The APP requests the cloud server to obtain the device information of the smart device and the binding code according to the smart device selected by the user. Wherein the device information includes the service set identifier (SSID) and the password of the smart device. For instance, the smart device is an air conditioner, the APP requests the cloud server to obtain device information (SSID and password of the air conditioner) of the air conditioner and the binding code, the binding code is a binding code with a certain time limit, and the binding code is configurated to bind the smartphone of the user when the smart device is registered.

Further, in the present disclosure, when the mobile terminal does not have an APP, for instance, the mobile terminal takes a smart speaker as an example, the user can also realize the binding process for smart device network configuration through the smart speaker. The smart speaker has a function of voice recognition, and the user recognizes the user's voice through the smart speaker, and the smart speaker provides a function of network configuration, information of various home appliances is pre-recorded through voice reception. The smart speaker recognizes the smart device needing to be configured according to the user's voice. For instance, when the user's voice selects an air conditioner as the smart device, the air conditioner is selected; when the user's voice selects a washing machine as the smart device, the washing machine is selected.

Similarly, the smart speaker requests the cloud server to obtain the device information of the smart device and the binding code according to the smart device selected by the user, wherein the device information includes the SSID and the password of the smart device. For instance, the smart device is an air conditioner, the smart speaker requests the cloud server to obtain the device information (SSID and password of the air conditioner) of the air conditioner and the binding code, the binding code is a binding code with a certain time limit, and the binding code is configured to bind the smart speaker of the user when the smart device is registered.

Step S20: receiving the binding code generated by the cloud server, and the device information sent by same, and connecting the smart device according to the device information.

Figure 3:
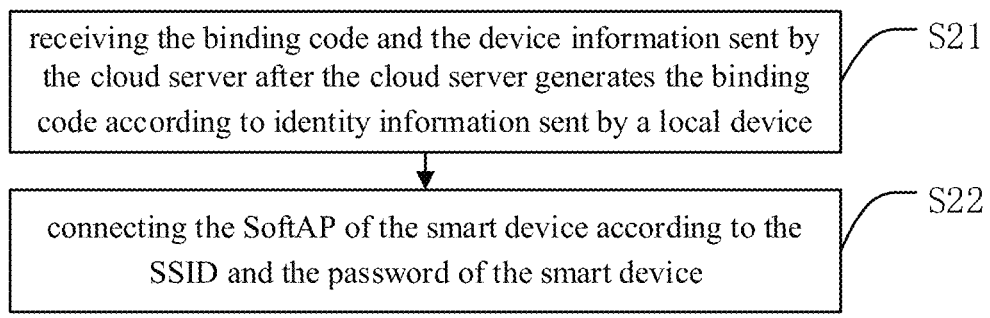
FIG. 3 is a flowchart of step S20 in the preferred embodiment of the binding method for device network configuration of the present disclosure.

For the specific process, please refer to FIG. 3, which is a flowchart of step S20 according to the binding method for device network configuration provided by the present disclosure.

As shown in FIG. 3, the step S20 includes:

Step S21: receiving the binding code and the device information sent by the cloud server after the cloud server generates the binding code according to identity information sent by a local device;

Step S22: connecting the SoftAP of the smart device according to the SSID and the password of the smart device.

Specifically, for instance, the binding code allocated by the cloud server to the APP of the mobile terminal is generated according to identity information (e.g., a user ID of the APP, an APP can correspond to a user ID for indicating exactly which user, i.e., for indicating identity information of the current user. When it is not an APP, i.e., the ID of the local device itself is sufficient, each device has an ID) sent by the local device. The cloud server knows which user the binding code corresponds to, and the cloud server sends the generated binding code, the SSID, and the password of the smart device to the APP of the smartphone. The APP receives the SSID and the password of the smart device, so that the smartphone can connect to the enabled SoftAP of the smart device.

Step S30: sending the binding code to the connected smart device, such that when the smart device is registered to the cloud server, the binding and connection to the smart device are realized according to the binding code.

Figure 4:
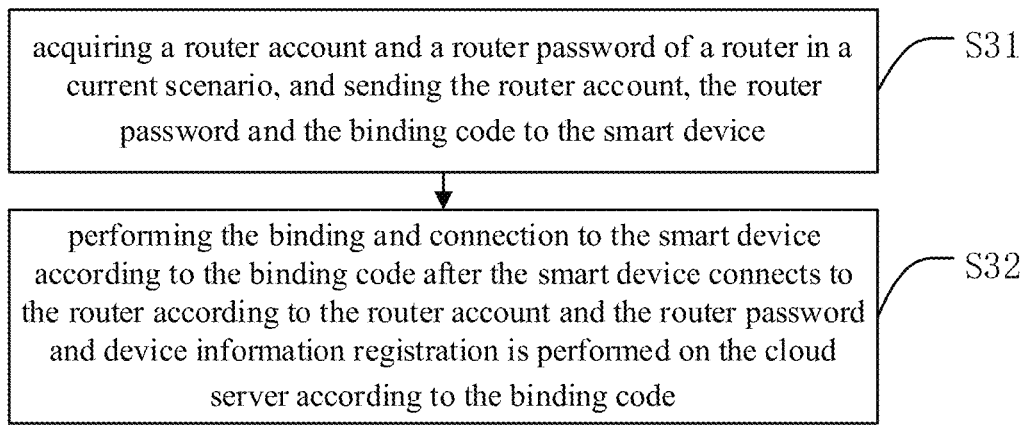
FIG. 4 is a flowchart of step S30 in the preferred embodiment of the binding method for device network configuration of the present disclosure.

For the specific process, please refer to FIG. 4, which is a flowchart of step S30 according to the binding method for device network configuration provided by the present disclosure.

As shown in FIG. 4, the step S30 includes:

Step S31: acquiring a router account and a router password of a router in a current scenario, and sending the router account, the router password, and the binding code to the smart device;

Step S32: performing the binding and connection to the smart device according to the binding code after the smart device connects to the router according to the router account and the router password and device information registration is performed on the cloud server according to the binding code.

Specifically, the APP of the smartphone acquires the router account and the router password of the router, and sends the router account and router password of the router (for instance, a home router) and the binding code to the smart device. After the smart device receives the router account, the router password, and the binding code, the smart device connects to the router according to the router account and the router password and performs a device information registration on the cloud server according to the binding code, and returns a response message (with a MAC address of the smart device, which is used to determine an address of a network device location) to the smartphone (a purpose of which is that the APP can search for a smart device according to whether the smart device returns a search device response message with a device ID to determine whether the device with that MAC address is bound), that is, the smart device connects to the home router according to the received router account number and the router password, and performs device information registration on the cloud server according to the binding code and its own identity (MAC address), and the cloud server returns the device ID.

Further, after the step S30, the method also includes: after receiving the response message returned by the smart device, the smartphone connects to the home router (without reconnecting when the router is in a connected state) and starts to broadcast a search device message, until the smart device returns a device ID as a search device response message, i.e., after the smart device has been successfully registered to the cloud server, the cloud server establishes a binding relationship between the smart device and the smartphone (i.e., the smart device can only be controlled and monitored by the bound mobile phone of the user), so that the binding process for smart device network configuration is performed.

The binding method for device network configuration of the present disclosure is compatible with mobile Android and APPLE systems. By connecting to a specified device SSID, it does not require the user to manually change WIFI settings, which brings convenience to the user and improves safety and efficiency for network configuration and binding of IoT devices, while providing a user-friendly interface for network configuration for the user to know which stage of network configuration and binding the device is currently in, so as to stop waiting blindly in the process of network configuration.

Embodiment II

Figure 5:
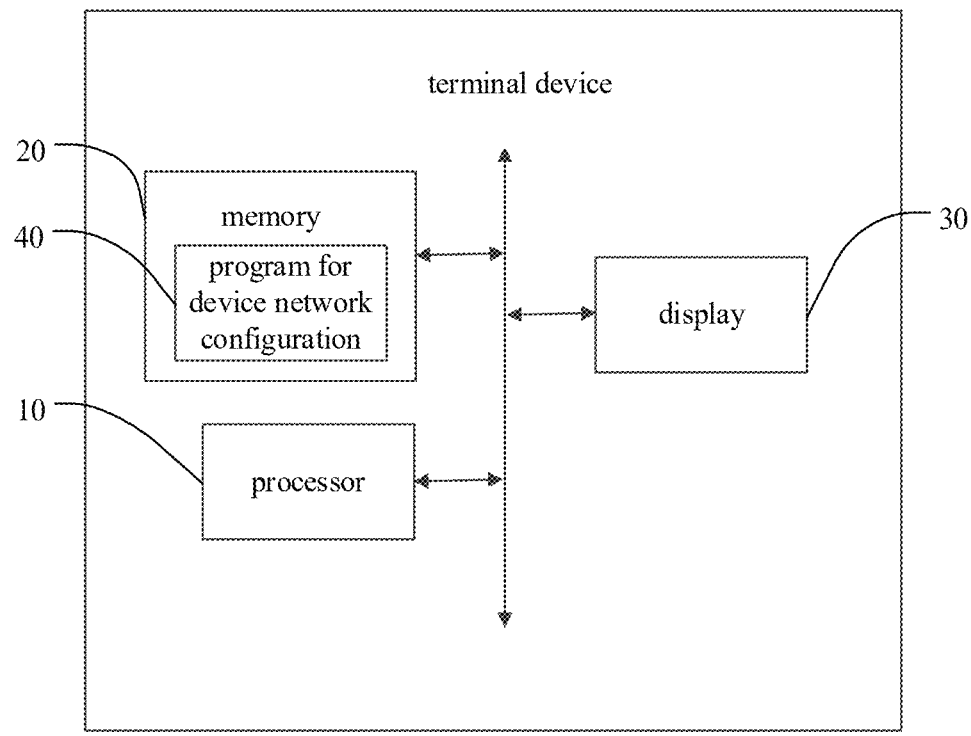
FIG. 5 is a schematic diagram of an operating environment of a preferred embodiment of a mobile terminal of the present disclosure.

Further, as shown in FIG. 5, based on the foregoing binding method for device network configuration, the present disclosure also provides a mobile terminal correspondingly, wherein the mobile terminal includes a processor 10, a memory 20, and a display 30. FIG. 5 merely shows some components of the mobile terminal, it should be understood, however, that it is not required to implement by using all of the illustrated components, and more or fewer components may be used.

In some embodiments, the memory 20 may be an internal storage unit of the mobile terminal, such as a hard disk or a memory of the mobile terminal. In other embodiments, the memory 20 may also be an external storage device of the mobile terminal, such as a plug-in U disk, a smart memory card (SMC), a secure digital (SD) card, a flash card, etc., equipped on the mobile terminal. Further, the memory 20 may also include not only an internal storage unit of the mobile terminal but also an external storage device. The memory 20 is configured to store application software and various data installed in the mobile terminal, such as program codes installing in the mobile terminal. The memory 20 may further be configured to temporarily store data that have been output or will be output. In one embodiment, a binding program 40 for device network configuration is stored in the memory 20, and the binding program 40 for device network configuration can be executed by the processor 10, thereby implementing the binding method for the device network configuration of the present disclosure.

In some embodiments, the processor 10 may be a central processing unit (CPU), a microprocessor, or other data processing chips, and is configured to run program codes or process data stored in the memory 20, for instance, perform the binding method for device network configuration and the like.

In some embodiments, the display 30 may be an LED display, a liquid crystal display, a touch-sensitive liquid crystal display, an organic light-emitting diode (OLED) touch device, and the like. The display 30 is configured to show information on the mobile terminal and show a visual user interface. The components 10-30 of the mobile terminal communicate with each other via a system bus.

In one embodiment, when the processor 10 executes the binding program 40 for device network configuration in the memory 20, the following steps are implemented:
    acquiring device information of a smart device and a binding code according to a request made to a cloud server from the smart device needing to be configured;
    receiving the binding code generated by the cloud server, and the device information sent by same, and connecting the smart device according to the device information; and
    sending the binding code to the connected smart device, such that when the smart device is registered to the cloud server, the binding and connection to the smart device are realized according to the binding code.

Before the step of acquiring device information of the smart device and the binding code according to the request made to the cloud server from the smart device needing to be configured, the method further includes:
    acquiring SoftAP information of the smart device;

connecting the smart device according to the SoftAP information.

The step of acquiring device information of the smart device and the binding code according to the request made to the cloud server from the smart device needing to be configured, specifically includes:
acquiring a device icon corresponding to the smart device after the smart device needing to be configured is detected to be in a network-configurable state;
requesting to obtain the device information of the smart device and the binding code from the cloud server according to the device icon.

The device information includes a service set identifier and a password of the smart device;
the binding code is a binding code with a certain time limit, and the binding code is used to bind the smart device when the smart device is registered to the cloud server.

The step of receiving the binding code generated by the cloud server, and the device information sent by same, and connecting the smart device according to the device information, specifically includes:
receiving the binding code and the device information sent by the cloud server after the cloud server generates the binding code according to identity information sent by a local device;
connecting the SoftAP of the smart device according to the service set identifier and the password of the smart device.

The step of sending the binding code to the connected smart device, such that when the smart device is registered to the cloud server, the binding and connection to the smart device are realized according to the binding code, specifically includes:
acquiring a router account and a router password of a router in a current scenario, and sending the router account, the router password, and the binding code to the smart device;
performing the binding and connection to the smart device according to the binding code after the smart device connects to the router according to the router account and the router password and device information registration is performed on the cloud server according to the binding code.

After the step of sending the binding code to the connected smart device, such that when the smart device is registered to the cloud server, the binding and connection to the smart device are realized according to the binding code, the method further includes a step of:
receiving a response message with a MAC address of the smart device returned by the smart device.

After the step of receiving a response message with a MAC address of the smart device returned by the smart device, the method further includes:
connecting the router and starting to broadcast a search device message, until the smart device returns a device ID as the search device response message after the smart device has been successfully registered to the cloud server, so that the binding for smart device network configuration is performed.

Embodiment III

Figure 6:
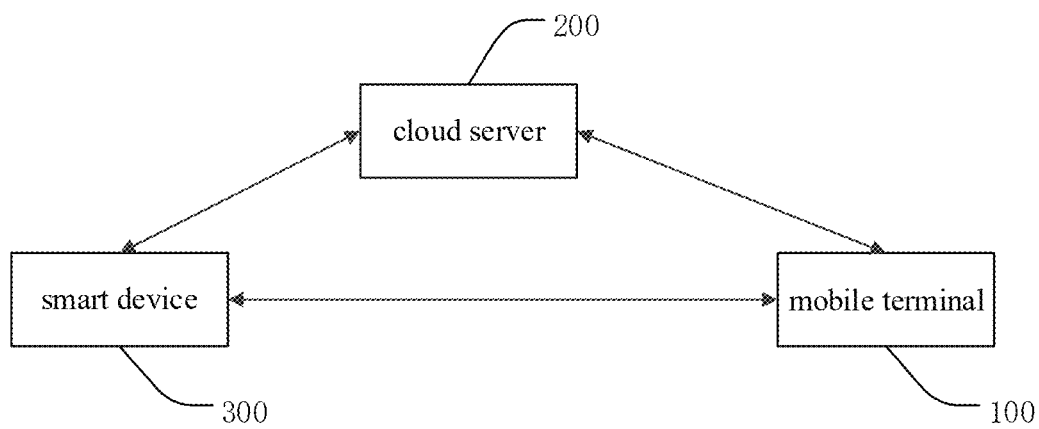
FIG. 6 is a schematic diagram of a principle of a preferred embodiment of a binding system for device network configuration of the present disclosure.

Further, as shown in FIG. 6 and FIG. 7, the present disclosure also provides a binding system for device network configuration, wherein the binding system for device network configuration includes the mobile terminal 100 as described above, which is respectively connected to a cloud server 200 and at least one smart device 300 in communication, and the smart device 300 is connected in communication with the cloud server 200.

The mobile terminal 100 is configured to select the smart device 300 needing to be configured, request the cloud server 200 to obtain the device information of the smart device 300 and the binding code, and realize the binding and connection to the smart device 300 according to the binding code. The cloud server 200 is configured to generate the binding code and send the binding code and the device information to the mobile terminal 100. The smart device 300 is configured to receive the router account, the router password, and the binding code sent by the mobile terminal 100, connect to the router according to the router account and the router password, and perform device information registration on the cloud server 200 according to the binding code, and return a response message to the mobile terminal 100.

The mobile terminal 100 is bound to the smart device 300 through the APP shown in FIG. 7, the cloud server 200 is a cloud shown in FIG. 7, and the smart device 300 is a device shown in FIG. 7.

As shown in FIG. 7, the smart device 300 is in a network-configurable state in advance, and the mobile terminal 100 requests the cloud server 200 to obtain device information and a binding code after clicking on the device icon of the interface through the APP. The cloud server 200 returns the SSID and the password of the device SoftAP and the binding code to the APP of the mobile terminal 100, and the APP of the mobile terminal 100 is connected to the device SoftAP to send the SSID, the password of the home router, and the binding code to the smart device 300. The smart device 300 returns the MAC address of the identity to the APP. The smart device 300 sends the MAC address of the device and the binding code to the cloud server 200, and the cloud server 200 returns the device ID to the smart device 300. The APP connects to the home router and sends a UDP search device request in a local area network, and the smart device 300 returns the device ID to the APP, so that the APP may display that a binding relationship between the smartphone and the smart device 300 have been established, and the binding process is performed.

Further, the smart device 300 is reset by pressing a button in advance to be in a network-configurable state, or the smart device is controlled to be in a network-configurable state through a remote control. The mobile terminal 100 realizes the binding process for network configuration with the smart device 300 through APP or voice recognition. The binding code allocated by the cloud server 200 to the APP of the mobile terminal 100 is generated according to the identity information sent by the local device. The cloud server 200 sends the generated binding code, the SSID, and the password of the smart device 300 to the mobile terminal 100, and the mobile terminal 100 receives the SSID and the password from the smart device 300 and connects to the enabled SoftAP of the smart device 300.

Embodiment IV

The present disclosure also provides a storage medium, wherein the storage medium stores a binding program for device network configuration, and when the device binding program for network configuration is executed by a processor, the steps of the above-mentioned binding method for device network configuration are implemented.

To sum up, the present disclosure provides a binding method and system for device network configuration, a mobile terminal and a storage medium. The method includes: acquiring device information of a smart device and a binding code according to a request made to a cloud server from the smart device needing to be configured; receiving the binding code generated by the cloud server, and the device information sent by same, and connecting the smart device according to the device information; and sending the binding code to the connected smart device, such that when the smart device is registered to the cloud server, the binding and connection to the smart device are realized according to the binding code. According to the present disclosure, a time-limit binding code is allocated to the mobile terminal by means of the cloud server so that the smart device is bound to the mobile terminal of the user when registering the smart device, such that it is ensured that the device information is secure and cannot be leaked, and the efficiency of the whole network configuration process is also improved.

Certainly, those of ordinary skill in the art can understand that all or part of the processes in the methods of the foregoing embodiments can be implemented by instructing relevant hardware (such as a processor, a controller, etc.) through a computer program. The program may be stored in a computer-readable storage medium, and the program may include the processes of the above various method embodiments when being executed. The storage medium may be a memory, a magnetic disk, an optical disc, and the like.

It should be understood that the application of the present disclosure is not limited to the above examples. For those skilled in the art, improvements or changes can be made according to the above description, and all such improvements and changes should fall within the protection scope of the appended claims of the present disclosure.

What is claimed is:

1. A binding method for device network configuration, wherein the binding method for device network configuration comprises:
   sending a request to a cloud server to request device information of a smart device and a binding code based on the smart device needing to be configured;
   receiving the binding code generated by the cloud server and the device information of the smart device, and connecting the smart device according to the device information; and
   sending the binding code to the connected smart device, such that when the smart device attempts to register with the cloud server, the binding code is used to make binding connection with the smart device.

2. The binding method for device network configuration according to claim 1, wherein before the step of acquiring device information of the smart device and the binding code according to the request made to the cloud server from the smart device needing to be configured, the method further comprises:
   acquiring SoftAP information of the smart device; and
   connecting the smart device according to the SoftAP information.

3. The binding method for device network configuration according to claim 1, wherein
   the step of acquiring device information of the smart device and the binding code according to
   the request made to the cloud server from the smart device needing to be configured, specifically comprises:
   acquiring a device icon corresponding to the smart device after the smart device needing to be configured is detected to be in a network-configurable state; and
   requesting the cloud server to obtain the device information of the smart device and the binding code according to the device icon.

4. The binding method for device network configuration according to claim 3, wherein the device information comprises a service set identifier and a password of the smart device;
   the binding code is a binding code with a certain time limit, and the binding code is configured to bind the smart device when the smart device is registered to the cloud server.

5. The binding method for device network configuration according to claim 4, wherein the step of receiving the binding code generated by the cloud server, and the device information sent by same, and connecting the smart device according to the device information, specifically comprises:
   receiving the binding code and the device information sent by the cloud server after the cloud server generates the binding code according to identity information sent by a local device; and
   connecting SoftAP of the smart device according to the service set identifier and the password of the smart device.

6. The binding method for device network configuration according to claim 5, wherein the step of sending the binding code to the connected smart device, such that when the smart device is registered to the cloud server, the binding and connection to the smart device are realized according to the binding code, specifically comprises:
   acquiring a router account and a router password of a router in a current scenario, and sending the router account, the router password, and the binding code to the smart device; and
   performing the binding and connection to the smart device according to the binding code after the smart device connects to the router according to the router account and the router password and device information registration is performed on the cloud server according to the binding code.

7. The binding method for device network configuration according to claim 6, wherein after the step of sending the binding code to the connected smart device, such that when the smart device is registered to the cloud server, the binding and connection to the smart device are realized according to the binding code, the method further comprises a step of:
   receiving a response message with a MAC address of the smart device returned by the smart device.

8. The binding method for device network configuration according to claim 7, wherein after the step of receiving the response message with the MAC address of the smart device returned by the smart device, the method further comprises:
   connecting the router and starting to broadcast a search device message, until the smart device returns a device ID as a search device response message after the smart device has been successfully registered to the cloud server, so that the binding for smart device network configuration is performed.

9. A mobile terminal, wherein the mobile terminal comprises: a memory, a processor, and a binding program for device network configuration that is stored in the memory and runs on the processor, wherein when the binding program for device network configuration is executed by the processor, the processor executes steps of a binding method comprising:

sending a request to a cloud server to request device information of a smart device and a binding code based on the smart device needing to be configured;

receiving the binding code generated by the cloud server and the device information of the smart device, and connecting the smart device according to the device information; and sending the binding code to the connected smart device, such that when the smart device attempts to register with the cloud server, the binding code is used to make binding connection with the smart device.

10. A binding system for device network configuration, wherein the binding system for device network configuration comprises a mobile terminal, and the binding system for device network configuration further comprises:

a cloud server and at least one smart device respectively connected in communication with the mobile terminal, wherein the smart device is connected in communication with the cloud server;

the mobile terminal configured to select the smart device needing to be configured, send a request to the cloud server to request device information of the smart device and a binding code, wherein the cloud server configured to generate the binding code and send the binding code and the device information to the mobile terminal; and the mobile terminal configured to receive the binding code generated by the cloud server and the device information of the smart device, connect the smart device according to the device information, and send the binding code to the connected smart device, such that when the smart device attempts to register with the cloud server, the binding code is used to make binding connection with the smart device;

the smart device configured to receive a router account, a router password and the binding code sent by the mobile terminal, connect to a router according to the router account and the router password, perform device information registration on the cloud server according to the binding code, and return a response message to the mobile terminal.

11. The binding system for device network configuration according to claim 10, wherein the smart device is reset by pressing a button in advance to be in a network-configurable state, or the smart device is controlled to be in the network-configurable state through a remote control.

12. The binding system for device network configuration according to claim 10, wherein the mobile terminal realizes a binding process for network configuration with the smart device through an APP or voice recognition.

13. The binding system for device network configuration according to claim 12, wherein the binding code allocated by the cloud server to the APP of the mobile terminal is generated according to identity information sent by a local device.

14. The binding system for device network configuration according to claim 13, wherein the cloud server sends the generated binding code, a service set identifier, and a password of the smart device to the mobile terminal, and after receiving the service set identifier and the password of the smart device, the mobile terminal will connect to an enabled SoftAP of the smart device.

15. A non-transitory computer readable storage medium, wherein the non-transitory computer readable storage medium stores a binding program for device network configuration, and the binding program for device network configuration is executed by a processor to implement the steps of a binding method for device network configuration, the steps of the binding method comprise:

sending a request to a cloud server to request device information of a smart device and a binding code based on the smart device that needing to be configured;

receiving the binding code generated by the cloud server and the device information of the smart device, and connecting the smart device according to the device information; and sending the binding code to the connected smart device, such that when the smart device attempts to register with the cloud server, the binding code is used to make binding connection with the smart device.

* * * * *